United States Patent
Sander

(10) Patent No.: US 7,216,395 B2
(45) Date of Patent: May 15, 2007

(54) MOP AND PAD WASHING MACHINE

(75) Inventor: Robert P. Sander, Racine, WI (US)

(73) Assignee: JohnsonDiversey, Inc., Sturtevant, WI (US)

( * ) Notice: Subject to any disclaimer, the term of this patent is extended or adjusted under 35 U.S.C. 154(b) by 628 days.

(21) Appl. No.: 10/209,688

(22) Filed: Aug. 1, 2002

(65) Prior Publication Data
US 2004/0019998 A1 Feb. 5, 2004

(51) Int. Cl.
*A47L 13/58* (2006.01)

(52) U.S. Cl. ................................ 15/260; 15/264

(58) Field of Classification Search .......... 15/260–264; 134/99.2, 201, 94.1, 99.1, 84, 110, 100, 104.2, 134/104.4, 96.1, 95.1, 100.1, 103.1; 220/23.87, 220/771

See application file for complete search history.

(56) References Cited

U.S. PATENT DOCUMENTS

| | | | |
|---|---|---|---|
| 1,326,039 A | 12/1919 | Dunwody | |
| 2,651,311 A * | 9/1953 | Rule | 134/89 |
| 2,705,091 A | 3/1955 | Marchand | 222/129 |
| 2,712,668 A * | 7/1955 | Thiele | 15/264 |
| 2,721,566 A * | 10/1955 | Brucker | 134/103.1 |
| 3,385,306 A | 5/1968 | Brater | 134/93 |
| 3,419,023 A | 12/1968 | Valdespino | 134/101 |
| 3,535,162 A | 10/1970 | Bray | 134/42 |
| 3,612,074 A * | 10/1971 | Dossey | 134/93 |
| 3,630,369 A * | 12/1971 | Nichols | 210/186 |
| 3,934,822 A | 1/1976 | Ross | 239/226 |
| 4,209,343 A | 6/1980 | Lane | 134/22 |
| 4,798,307 A * | 1/1989 | Evrard | 220/501 |
| 5,147,615 A | 9/1992 | Bird | 422/261 |
| 5,427,127 A * | 6/1995 | Nogi et al. | 134/100.1 |
| 5,428,860 A | 7/1995 | Hurt | 15/262 |
| 5,839,454 A * | 11/1998 | Matz | 134/57 D |
| 5,983,441 A | 11/1999 | Williams | 15/261 |
| 6,006,397 A | 12/1999 | Williams | 15/261 |
| 6,128,803 A | 10/2000 | Dickinson | 15/261 |
| 6,283,170 B1 | 9/2001 | Robinson | 141/1 |
| 6,374,867 B1 * | 4/2002 | Maiuro | 141/2 |
| 6,389,638 B1 | 5/2002 | Dickinson | 15/261 |
| 6,619,318 B2 * | 9/2003 | Dalhart et al. | 137/565.34 |

FOREIGN PATENT DOCUMENTS

| | | | |
|---|---|---|---|
| DE | 30 24 039 A1 | | 1/1982 |
| JP | 5-192286 | * | 8/1993 |
| WO | WO 97/49327 | * | 12/1997 |

OTHER PUBLICATIONS

One page from a 2001 Report to Shareholders by Newell Rubbermaid showing a mop bucket.

* cited by examiner

*Primary Examiner*—Terrence R. Till
(74) *Attorney, Agent, or Firm*—Neil E. Hamilton; James J. Sales; Renee J. Rymarz

(57) ABSTRACT

A washing apparatus for mop heads and washing pads which has the introduction of cleaning solution into a compartment for the mop as well as an overflow and drain function. The washer provides affordability, eliminates the need for electricity as a power source or lifting the cleaning water so as to drain the unit, and eliminates the possibility of back injuries associated with lifting. The washing apparatus also affords versatility that it can be combined with a mop bucket with a wringer function. Further, it can include accessories such as a spray nozzle or a foam gun.

15 Claims, 7 Drawing Sheets

MOP AND PAD WASHING MACHINE

CROSS-REFERENCE TO RELATED APPLICATIONS

NONE

STATEMENT REGARDING FEDERALLY SPONSORED RESEARCH OR DEVELOPMENT

NONE

BACKGROUND OF THE INVENTION

1. Technical Field

This invention relates to washing apparatus and more particularly to an apparatus for washing mop heads and pads.

2. Background Art

Mops are used extensively in cleaning floors. While much attention is given to products for use in the cleaning the floors, not much attention has been given to cleaning the mops.

A typical sequence of usage of a mop involves placing it in a wash tub or bucket with cleaning solution, wringing out excess solution, mopping a floor, wringing out the dirty solution and placing the mop back in the solution. The sequence is then repeated. In many situations when the mopping operation is completed, no attempt is made to further wash the mop head such as by running clean water over it. Consequently when the mop is used subsequently, much of the dirt or foreign material is introduced into the wash water for the next mopping operation. The problem of the dirty mop becomes more serious when it is used to mop up breakage in a grocery store which involves all types of food items, such as pickle juice, ketchup, milk, etc. It becomes even more serious in institutions such as schools, wherein a janitor is required to mop up all types of materials including urine and vomit. Dirty mop water is not changed frequently enough due to the physical effort needed to lift and drain the bucket and the repugnance of physical contact with the contaminated cleaning solution and dirty mop head.

There is no standard in North America for cleaning mops and pads. In general, on site wash machines have not been accepted in North America due to initial cost, space constraints, electrical hook ups and maintenance costs.

The use of a dirty mop can result in the following:

Degradation of floor appearance due to the use of dirty mops and pads.

Floor finish discoloration leading to premature strip out and re-installation.

Wasted labor dollars on ineffective daily maintenance.

The spread of bacteria causing malodor and an unhealthy environment.

The transfer of contaminants which may alter the floor surface and change the acceptable standard for the coefficient of friction possibly contributing to slip/falls.

Shortened mop and pad life contributing to increased supply expenditures.

Visual and sensory impact on a customer when dirty mop heads emitting malodor are used.

Could be a primary cause in failed store inspections generating additional wasted dollars for compliance and possible fines.

Possible increase in pest control budget due to spread of bacteria and contamination.

Accordingly, there is a need for an apparatus which can clean a mop head in an efficient manner so as to reduce the possibility of carryover of dirt, contamination, and foreign material into the cleaning solution for subsequent mopping operations.

The objects of the invention therefore are:

Providing a mop head and pad washing apparatus which can efficiently clean and sanitize a dirty mop head automatically as needed.

Providing a mop head and pad washing apparatus of the foregoing type which is easy to operate without an increase in labor costs.

Providing a mop head and pad washing apparatus which provides an efficient drain for both contaminated cleaning solution as well as sediment from a bucket bottom.

Providing a mop head and pad washing apparatus of the foregoing type which includes a wringer function.

Providing a mop head and pad washing apparatus of the foregoing type which does not require an electrical power source.

Providing a mop head and pad washing apparatus which is compact and portable.

Providing a mop head and pad washing machine of the foregoing type which can provide a fully automatic detergency and water cycle control.

SUMMARY OF THE INVENTION

The foregoing objects are accomplished and the shortcomings of the prior art are overcome by the washing apparatus for mop heads and washing pads of this invention which includes in one embodiment a housing having a compartment for wash water with the housing having at least one side wall. A water inlet conduit is operatively connected to the compartment and a holding member for a cleaning product is operatively supported by the housing. There is a conduit for transporting the cleaning product from the holding member to the water inlet conduit. An opening is disposed in the side wall which is constructed and arranged for the exchange of contaminated cleaning solution with fresh solution by allowing contaminated solution to pass therethrough and a drain outlet that is provided in a bottom portion of the housing.

In another embodiment, the drain outlet is not employed during a wash and rinse cycle.

In a further embodiment, the water inlet conduit and drain outlet are connected together at the bottom of the compartment.

In still another embodiment, the holding member is a container for the cleaning product and an eductor is connected to the water inlet conduit, with the conduit for transporting the cleaning product connected at one end to the container and at another end to the eductor.

In yet another embodiment, the holding member is a compartment for the cleaning product. A water conduit is connected at one end to the water inlet conduit and to the compartment for the cleaning product at another end. A conduit for mixed product and water is connected at one end to the compartment for the cleaning product and to the water inlet conduit at another end.

In one aspect, a grate member is positioned in the compartment for wash water and below the opening in the side wall.

In another aspect, an outlet conduit is sealably connected to the opening in the side wall.

In yet another aspect, there is a support member for the container operatively connected to the housing.

In still other aspects, the housing further includes a mop wringing compartment; and a base portion with wheels connected thereto; a handle member is connected to a wringer in the wringing compartment; and a drain hose is connected to the drain outlet.

These and still other objects and advantages of the invention will be apparent from the description which follows. In the detailed description below a preferred embodiment of the invention will be described in reference to the full scope of the invention. Rather, the invention may be employed in other embodiments.

DESCRIPTION OF THE PREFERRED EMBODIMENT

Figure 1:
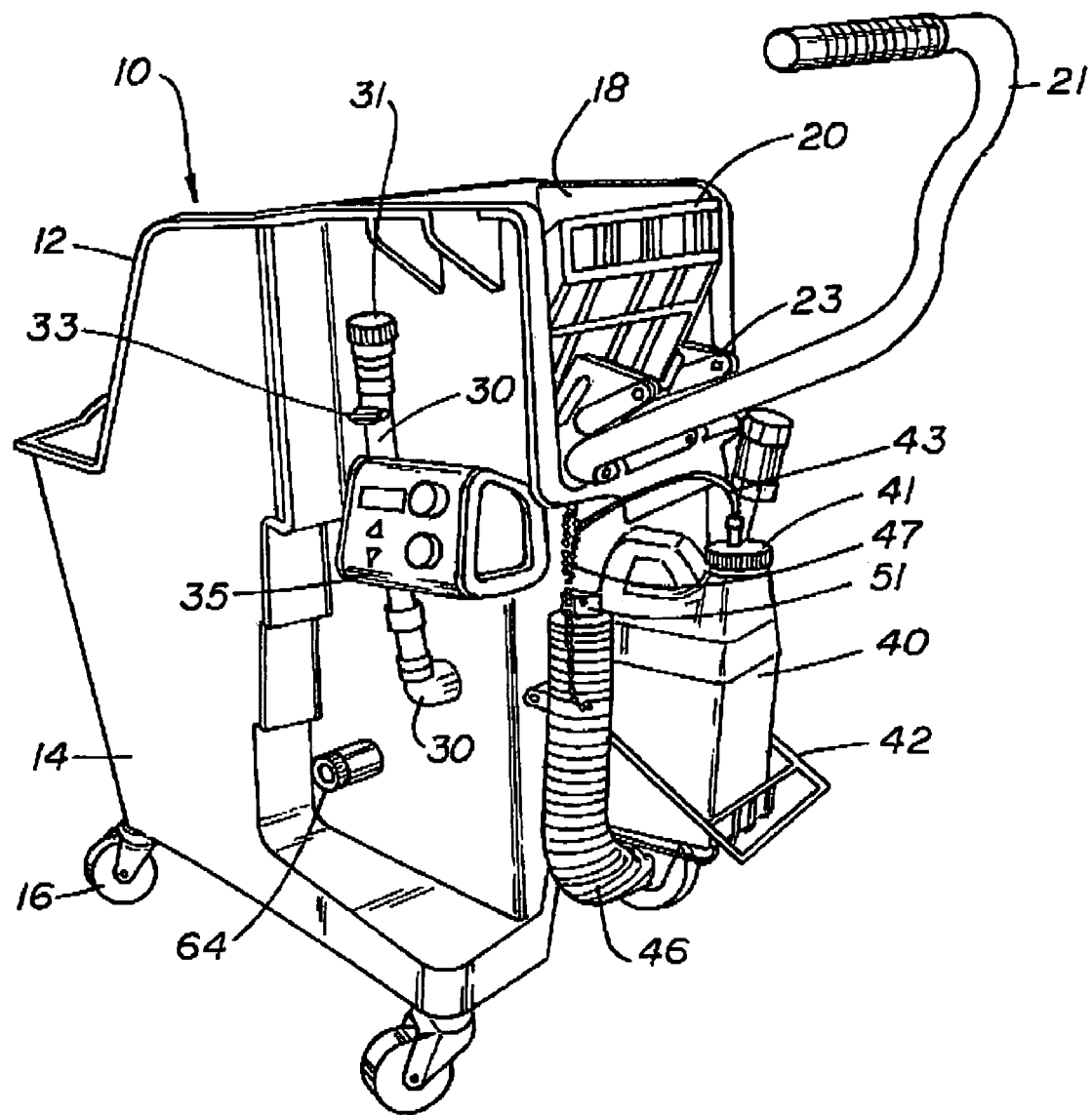
FIG. 1 is a back perspective view of the mop and a pad washing machine of the invention.
Figure 2:
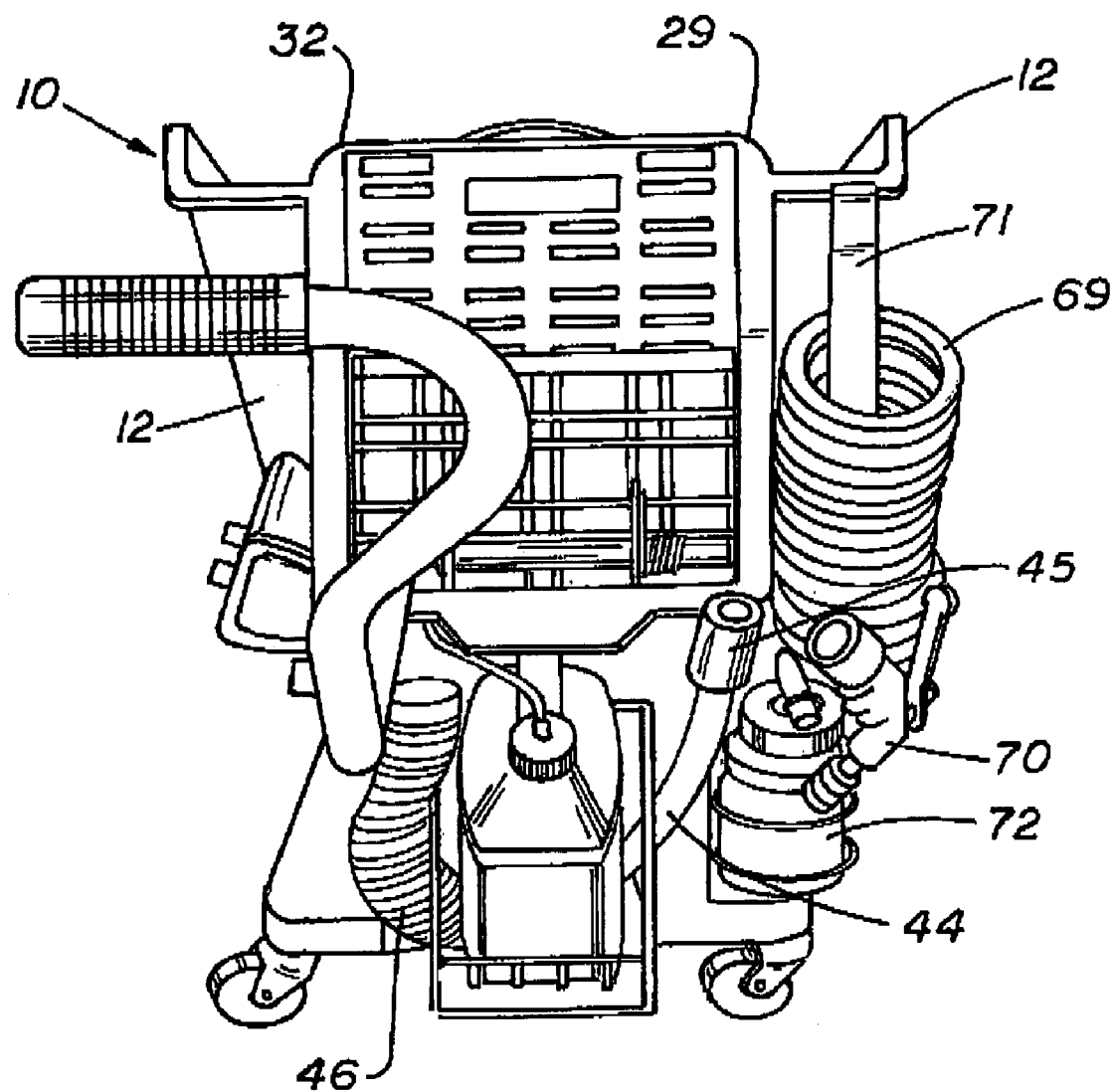
FIG. 2 is a back elevational view of the machine shown in FIG. 1.
Figure 3:
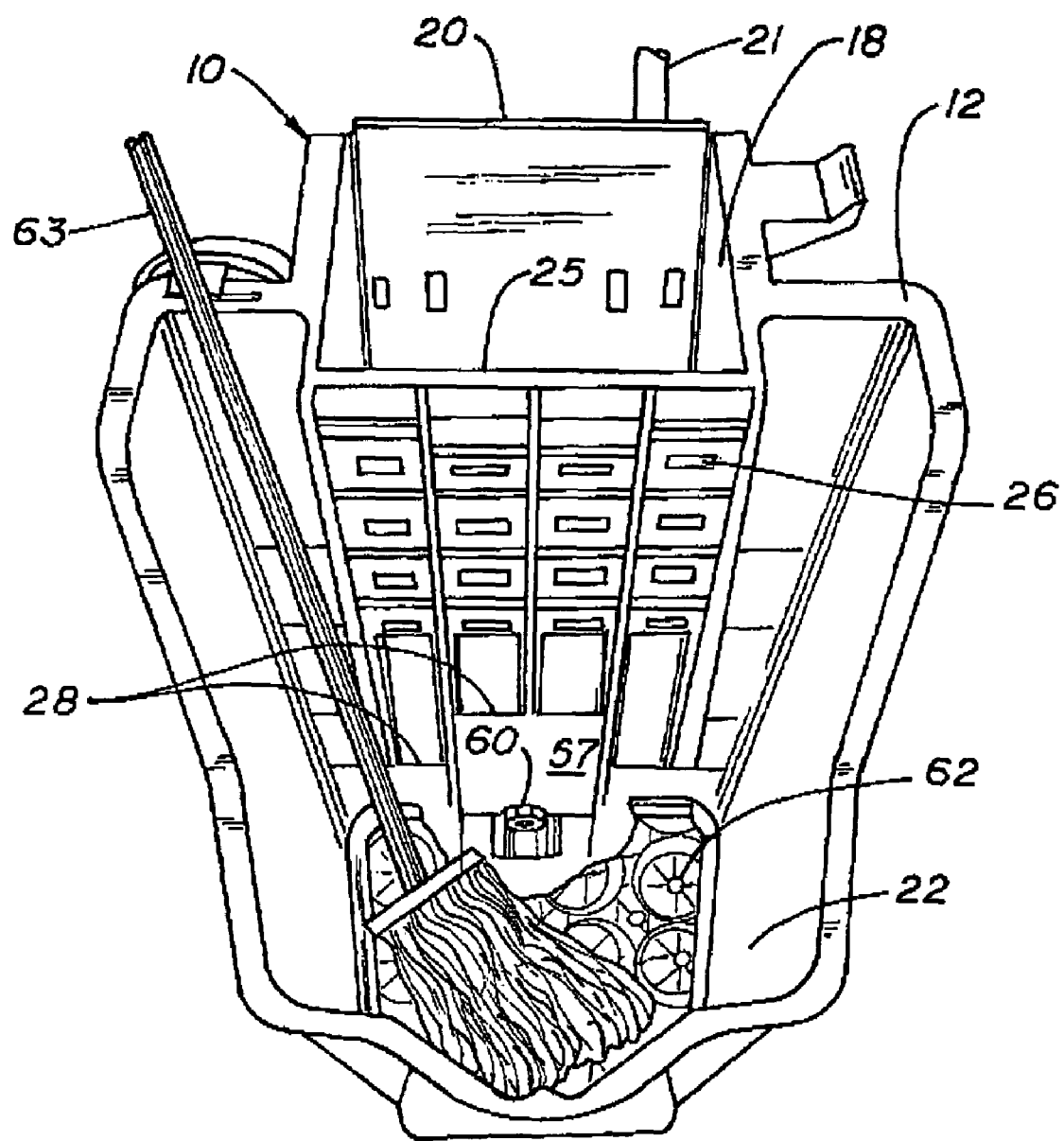
FIG. 3 is a top view of the machine with a portion of a grate broken away.

Referring to FIGS. 1–3, the mop and pad washing apparatus generally 10 includes a housing 12 with a base 14 which is attached to the casters 16. As seen in FIG. 3, there is provided an upper compartment 18 and a lower compartment 22.

A wringer plate 20 is disposed in the upper compartment 18 and is activated by the handle 21. This housing with the compartments previously described is provided in a unit available from Continental Manufacturing Company in St. Louis, Mo. and disclosed in U.S. Pat. No. 6,128,803. In practice, the mop is wrung out in compartment 18 with the excess water flowing through the apertures 26 in front wall 25. The waste water then flowing into compartment 22.

As seen in FIG. 1, a water inlet conduit 30 is provided with a hose connection 31 as well as an on/off valve 33. Water inlet conduit 30 is connected to an electronic water timer mechanism 35 available as the Touch-Set™ from Nelson located in Peoria, Ill. A container 40 for chemical cleaning concentrate is supported by the rack 42. A preferred cleaning concentrate is VIROX™ available from Johnson-Diversey, Inc. A cap 41 is secured of the container 40 and is connected to a siphon tube 43. An overflow hose 46 is supported from the housing 12 by the chain 47. There is also a drain hose 44 for draining water from the compartment 22. It is suitably supported from the housing by a loop and hook arrangement (not shown).

Figure 4:
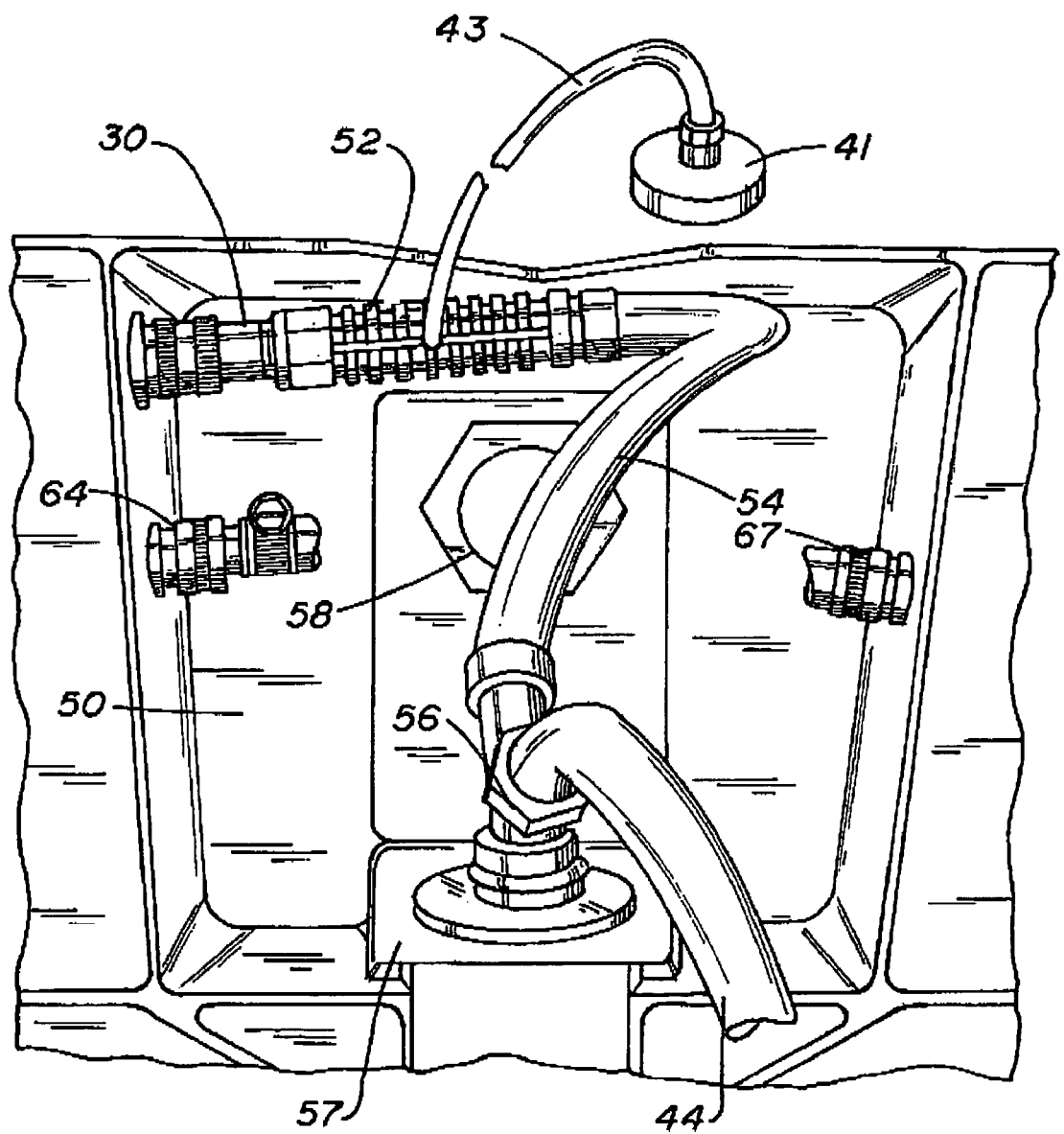
FIG. 4 is a bottom view of the machine showing the overflow port and conduit connections.

As seen in FIG. 4, water inlet conduit 30 is connected to eductor 52 which also has the siphon tube 43 connected thereto. On the downstream side of the eductor 52 a water conduit 54 connects to the Y connector 56 which in turn is connected to the orifice 60 in the base wall 57 of the compartment 22 for supplying cleaning and sanitizing agent to the compartment 22. (See FIG. 3). It will also be noted in conjunction with FIG. 4 that the drain hose 44 is connected to the Y connector 56 and accordingly the orifice 60.

Figure 7:
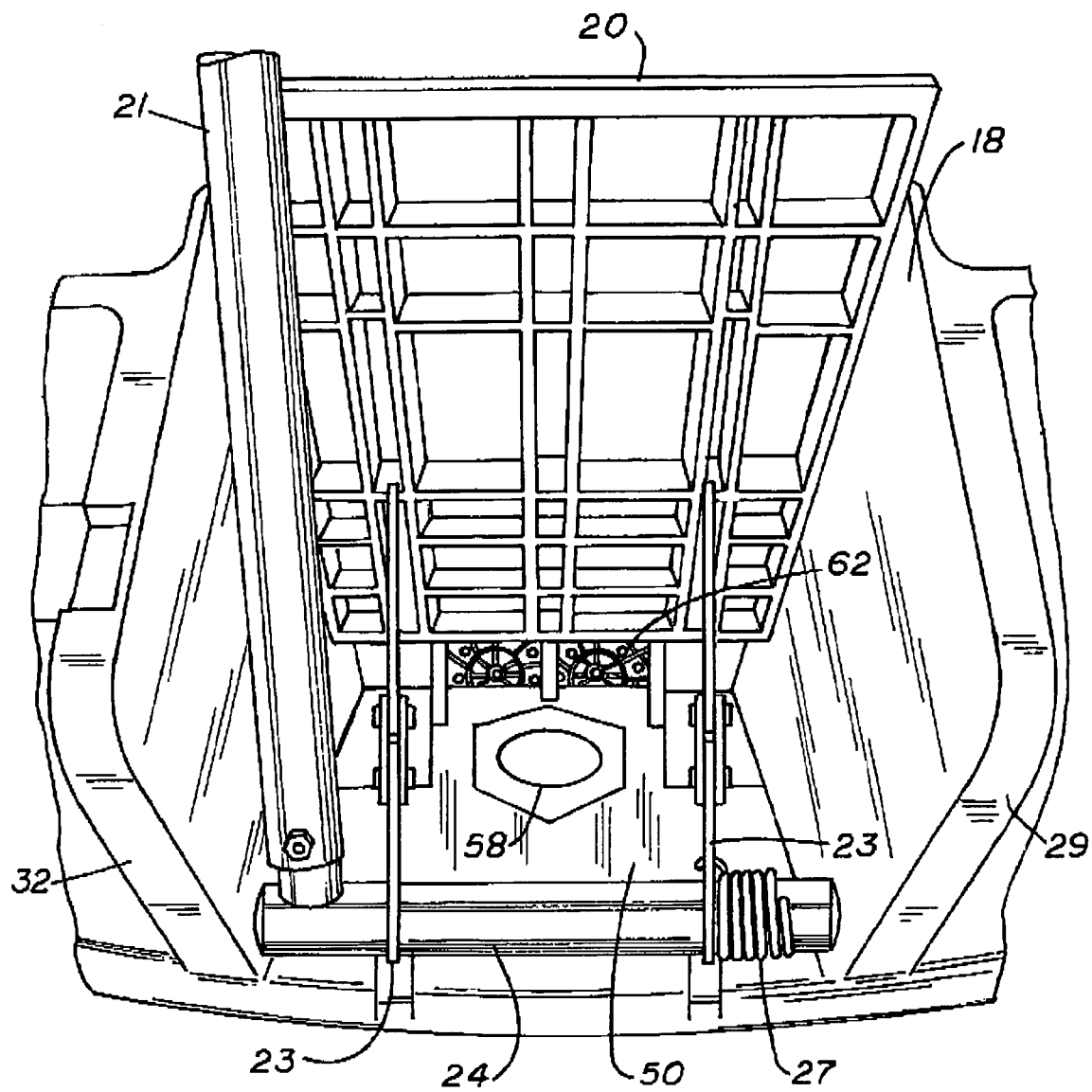
FIG. 7 is a partial top view with the wringer plate in a retracted position.

Referring to FIGS. 4 and 7, there is a median wall 50 which provides a floor to the compartment 18. It has an outlet 58 to which is sealably connected the overflow hose 46. Median wall 50 is located behind front wall 25 and apertures 26, as seen in FIG. 3 where a grate 62 is disposed in the bottom portion of the compartment 22 and above the orifice 60. This is for the purpose of supporting a mop 63.

Figure 5:
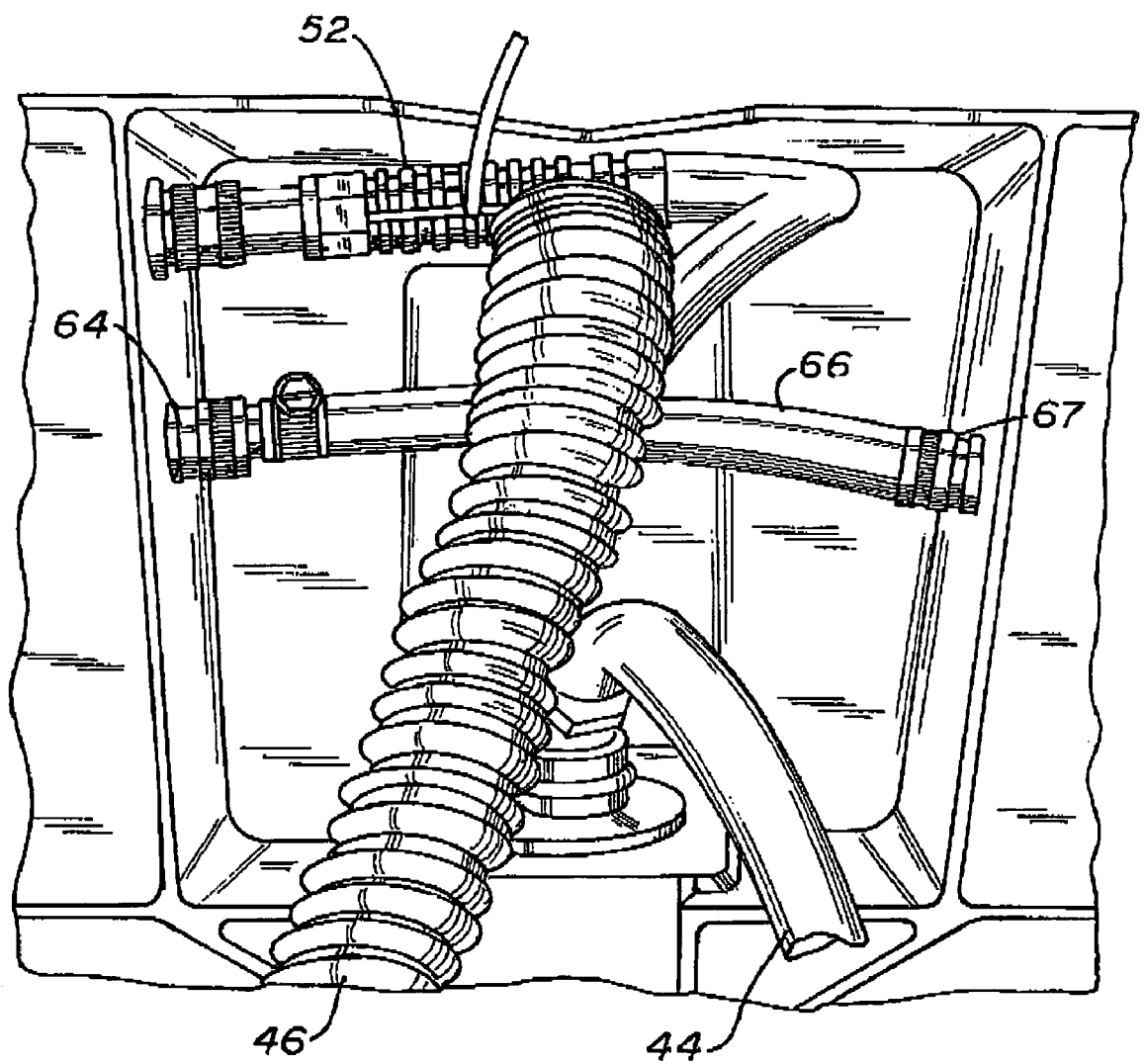
FIG. 5 is a view similar to FIG. 4 showing the overflow drain hose.

As seen in FIGS. 1, 4, and 5 there are hose connections 64 and 67 which are interconnected by the conduit 66. Hose connection 64 affords a connection to a water supply hose for purposes of supplying water to the coiled hose 69 and spray nozzle 70, via conduit 66 and connection 67. The coiled hose is supported from the housing 12 by the strap 71. A foam gun 72 is also supported by the housing 12 for connection to the hose 69.

Figure 6:
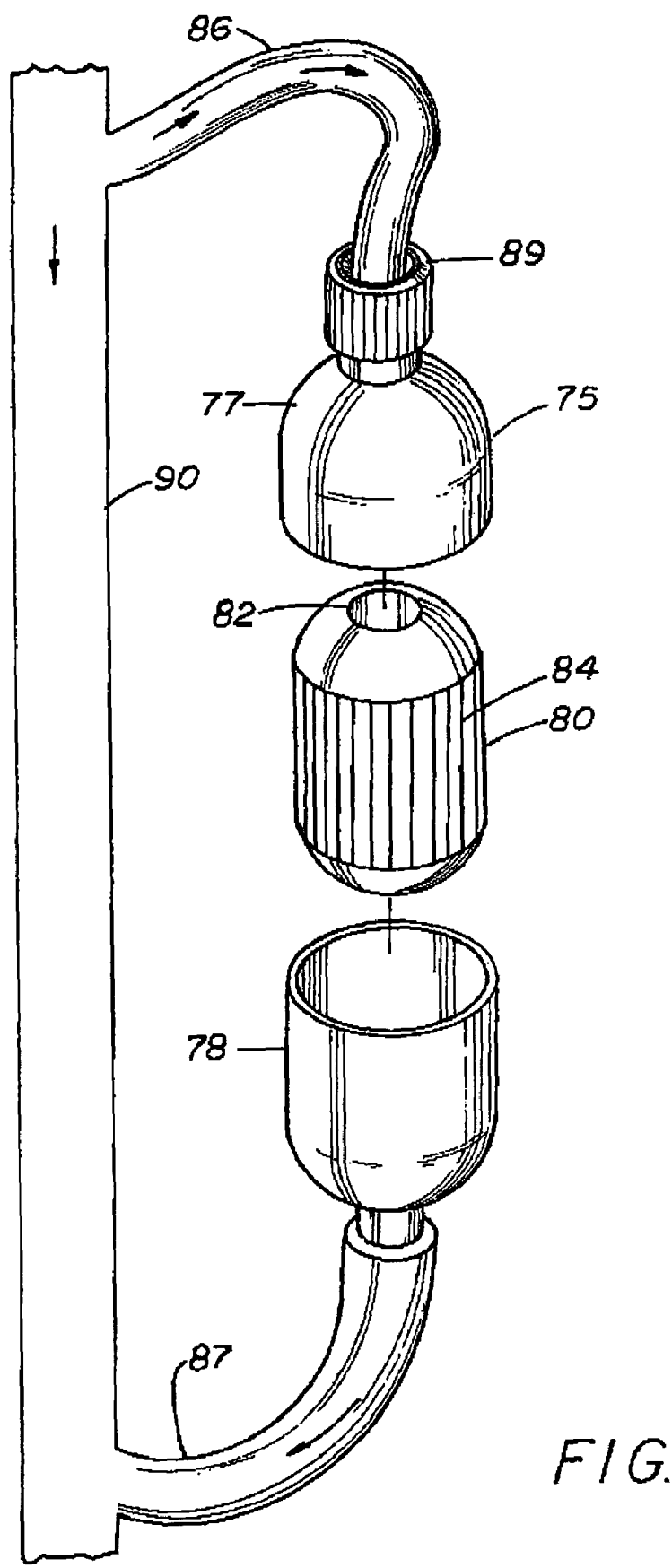
FIG. 6 is an exploded view of an alternative embodiment showing a container for a solid detergent.

FIG. 6 represents an alternative embodiment for supplying a cleaning or sanitizing agent. In place of the concentrate container 40 as well as the cap 41, the tube 43 and the eductor 52 (as shown in FIGS. 1 and 5), the detergent container 75 generally can be substituted with the solid cleaning detergent 80. In this instance the detergent container 75 includes two cup portions 77 and 78 providing a compartment for the detergent 80. Detergent 80 has a central passage 82 as well as exterior grooves 84 for purposes of the passage of water through it and over it so as to dissolve the detergent. Inlet tube 86 and the outlet tube 87 are connected, respectively, to the end portions of the cups 77 and 78 with an end cap 89 provided for connection to the inlet tube 86. The water conduit 90 supplies water to the detergent container 75 by means of the inlet tube 86 which dissolves some of the detergent with the water and passage through outlet tube 87 which in turn will allow the concentrated solution to flow back into the conduit 90 which is ultimately connected to the orifice 60.

Referring to FIG. 7, handle 21 is connected to shaft 24 journaled in side walls 29 and 32. Hinge arms 23 are connected to wringer plate 20 and a spring 27 biases one of the spring arms 23 and accordingly shaft and handle 21 to an outward position as seen in FIG. 1.

Operation

A fuller understanding of the washing apparatus 10 will be had by a description of the operation. Referring to FIGS. 1–3, the washing apparatus 10 will be initially utilized as both a mopping device and as a mop cleaner. Cleaning water with detergent is placed in compartment 22 and utilized in the usual manner to clean a floor surface. With the collection of dirty water, the mop is placed in the compartment 18 and the mop compressed by an upward movement of the handle 21 which presses the wringer plate 20 against the mop with the resulting dirty water flowing through the apertures 26 back into compartment 22. This compressing of the wringer plate 20 is visualized in conjunction with FIG. 7 wherein the handle 21 rotates the shaft 24 which in turn pivots the hinge arms 23.

When it is desired to clean the mop, the dirty water water can be emptied from the compartment 22 by an opening of the drain hose 44 which will have a suitable valve 45 connected to an end thereof. When emptied, the drain hose 44 is closed and the water inlet conduit 30 connected to a water source such as another hose. A dirty mop 63 with handle left attached, is then placed in the compartment 22 and rests on the grate 62. Overflow hose 46 is lowered to the bottom of the unit and the closure cap 51 opened. The timer 35 is set to deliver a quantity of water for a given period of time through the water inlet conduit 30 as well as water conduit 54 leading into the compartment 22 via the orifice 60. As it passes through the eductor 52 it siphons concentrate from the container 40 through the tube 43. When the water in the compartment 22 reaches the height of the outlet 58 in the median wall 50, it flows through slots 28 in front wall 25 into overflow outlet 58, and into the overflow hose 46. This affords the removal of contaminated solution and replaces with clean solution. The timer 35 can be set for multiple cycles at different time intervals introducing either clean water or water combined with cleaning solution. The timed intervals allow for a soak stage. After a suitable period of time, the timer stops all flow and the mop can be allowed to soak in the solution. When it is desired to empty compartment 22, the valve 45 on the drain hose is opened which allows the compartment 22 to drain. The excess cleaning solution can be removed from the mop by placing it in the compartment 18 and compressing it by the wringer plate 20 as previously described. With the mop cleaning operation completed, the drain hose 44 and the overflow hose 46 are returned to their normal positions as shown in FIG. 1.

If it is desired to utilize the spray nozzle 70 on the hose 69, the hose is connected to the connection 67 and a water inlet hose is disconnected from connection 31 and connected to hose connection 64. In this mode, the foam gun 72 can be substituted for the spray nozzle 70.

If it is desired to use the solid detergent 80 as the cleaning material, then the detergent container 75 will be substituted for the solution container 40 as previously described.

In the previous description, the water entering water inlet conduit 30 siphons concentrate from the concentrate solution container 40 at all times. If it is desired, it can be bypassed by providing a valve arrangement so as to bypass the eductor and introduce clean water into the compartment 22.

A mop 63 has been described for washing in compartment 22. A mop washing pad can be cleaned in a similar fashion.

It will thus be seen that there is now provided a fully automatic "set and forget" mop and pad cleaning apparatus. This is achieved by solution exchange. This is effected by timed cleaner & rinse cycles which fill from bucket bottom displacing contaminated solution with fresh solution as well as soak and metered chemical efficacy. Automatic cleaning cycles can be custom set to accommodate different soils and soil loads.

Manual drain & auto fill is also provided. The bucket drain hose 44 affords for quick drain of contaminated cleaning solution and refill with fresh solution using the timer "quick fill" setting when employed as a conventional floor cleaning system. The bucket drain hose 44 is also used to remove accumulated sediment from bucket bottom.

A two-in-one cleaning system is further afforded as the washing apparatus automatically cleans mop heads without having to remove from mop handle and cleaning pads. The system will automatically clean and refill bucket with fresh cleaning solution for the next use. It can be used as a semi-automatic mop and bucket floor cleaning system by using the bucket drain hose and a quick fill timer setting for refilling with plain water or metered cleaning solution and water.

The washing apparatus affords a unique cleaning and rinsing function by introducing cleaning solution and rinse water from the bottom of the compartment 22 while draining contaminated solution and rinse water from an upper level at the side such as through outlet 58.

The washing apparatus has been described in conjunction with a mop bucket. It is not essential that the wringer compartment 18 be utilized and can be eliminated.

The preferred eductor will have an air gap for back flow preventions. The air gap is advantageous for use with the washing apparatus 10 as it will allow some air to enter the water conduit 54 thus providing oxygen in conjunction with the cleaning solution to the compartment 22.

An alternative to draining the wash water from the compartment 22 would be to leave it in the bucket and merely charge in the mop cleaner solution with excess water flowing out through the overflow outlet 58. Further, it is not necessary to have the hose connections 67 and 64 for the hose 69 and spray nozzle 70 or the foam gun 72. While the Touch-Set timer mechanism has been indicated, it is one of many timer mechanisms which can be employed for the described timing functions. All such and other modifications within the scope of the invention are meant to be within its scope as defined by the appended claims.

What is claimed is:

1. A washing apparatus for mop heads and washing pads comprising:
    a housing having a compartment for wash water, the housing having at least one side wall;
    a water inlet conduit operatively connected to the compartment;
    a holding member for a cleaning product operatively supported by the housing;
    a conduit for transporting the cleaning product from the holding member to the water inlet conduit;
    an opening in the side wall constructed and arranged to allow contaminated solution to pass therethrough; and
    a drain outlet in a bottom portion of the housing.

2. The washing apparatus as defined in claim 1 wherein the holding member is a container for the cleaning product; and further including an eductor connected to the water inlet conduit, with the conduit for transporting the cleaning product connected at one end to the container and at another end to the eductor.

3. The washing apparatus as defined in claim 2 further including a pate member positioned in the comportment for wash water and below the opening in the side wall.

4. The washing apparatus as defined in claim 2 further including an outlet conduit sealably connected to the opening in the side wall.

5. The washing apparatus as defined in claim 2 further including a support member for the container operatively connected to the housing.

6. The washing apparatus as defined in claim 5 wherein the support member is a floor member connected to the housing.

7. The washing apparatus as defined in claim 5 wherein the support member is a rack connected to the housing.

8. The washing apparatus as defined in claim 1 wherein the holding member is a compartment for the cleaning product;
    a water conduit connected at one end to the water inlet conduit and to the compartment for the cleaning product at another end; and
    a conduit for mixed product and water connected at one end to the compartment for the cleaning product and to the water inlet conduit at another end.

9. The washing apparatus as defined in claim 8 further including a grate member positioned in the compartment for wash water below the opening in the side wall.

10. The washing apparatus as defined in claim 8 further including an outlet conduit sealably connected to the opening in the side wall.

11. The washing apparatus as defined in claim 1 wherein the housing further includes a mop wringing compartment.

12. The washing apparatus as defined in claim 1 wherein the housing further includes a base portion with wheels connected thereto.

13. The washing apparatus as defined in claim 12 further including a handle member connected to the housing.

14. The washing apparatus as defined in claim 1 further including a drain hose connected to the drain outlet.

15. A washing apparatus for mop heads and washing pads comprising:
- a housing having a compartment for collecting wash water, the housing having at least one side wall;
- a water inlet conduit operatively connected to a bottom of the compartment;
- a holding member for a cleaning product operatively supported by the housing;
- a conduit for transporting the cleaning product from the holding member to the water inlet conduit; and
- an opening in the side wall constructed and arranged to allow contaminated solution to pass therethrough.

* * * * *